United States Patent
Robison et al.

(10) Patent No.: US 12,314,171 B2
(45) Date of Patent: May 27, 2025

(54) ADJUSTING GARBAGE COLLECTION BASED ON INPUT/OUTPUT FLOW RATES

(71) Applicant: International Business Machines Corporation, Armonk, NY (US)

(72) Inventors: Micah Robison, Tucson, AZ (US); Matthew G. Borlick, Tucson, AZ (US); Beth Ann Peterson, Tucson, AZ (US); Lokesh Mohan Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/385,826

(22) Filed: Oct. 31, 2023

(65) Prior Publication Data
US 2025/0139002 A1    May 1, 2025

(51) Int. Cl.
*G06F 16/30* (2019.01)
*G06F 11/30* (2006.01)
*G06F 12/02* (2006.01)

(52) U.S. Cl.
CPC ...... *G06F 12/0253* (2013.01); *G06F 11/3037* (2013.01)

(58) Field of Classification Search
CPC .............. G06F 12/0253; G06F 11/3037
See application file for complete search history.

(56) References Cited

U.S. PATENT DOCUMENTS

| 8,713,268 | B2 | 4/2014 | Dillow et al. |
| 9,671,960 | B2 | 6/2017 | Patel et al. |
| 10,649,681 | B2 | 5/2020 | Suhas et al. |
| 11,169,707 | B2 * | 11/2021 | Blount .................. G06F 3/061 |
| 2013/0232310 | A1 | 9/2013 | Kruus |
| 2015/0169442 | A1 * | 6/2015 | Fisher ................ G06F 12/0253 |
| | | | 711/103 |
| 2015/0347296 | A1 * | 12/2015 | Kotte .................... G06F 3/0679 |
| | | | 711/103 |
| 2018/0165022 | A1 * | 6/2018 | Tomic ................ G06F 11/1004 |
| 2020/0073571 | A1 * | 3/2020 | Chen ........................ G06N 5/04 |
| 2020/0192794 | A1 * | 6/2020 | Lee ...................... G06F 12/0246 |
| 2022/0413708 | A1 | 12/2022 | Canepa |
| 2024/0134789 | A1 * | 4/2024 | Betsuno ................. G06F 3/061 |

FOREIGN PATENT DOCUMENTS

EP    3438839 A1    2/2019

* cited by examiner

*Primary Examiner* — Khanh B Pham
(74) *Attorney, Agent, or Firm* — Zilka-Kotab, P.C.

(57) ABSTRACT

A computer-implemented method, according to one approach, includes: monitoring performance in NVRAM having a plurality of memory blocks. Moreover, a change in the flow rate of I/O requests received at the NVRAM is identified as a result of the monitoring. In response to identifying the change is an increase in the flow rate of received I/O requests, the percentage of invalid pages in a given block of NVRAM that triggers garbage collection to be performed on the given block is increased. However, in response to identifying the change is a decrease in the flow rate of received I/O requests, the percentage of invalid pages in a given block that triggers garbage collection to be performed on the given block is decreased.

20 Claims, 10 Drawing Sheets

ADJUSTING GARBAGE COLLECTION BASED ON INPUT/OUTPUT FLOW RATES

BACKGROUND

The present invention relates to data storage, and more specifically, this invention relates to performing select input/output (I/O) requests in memory despite the memory being placed in a protected state.

Using Flash based memory as an example of non-volatile random access memory (NVRAM), the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, the operational efficiency of NVRAM components typically degrades over time. For instance, virtually all pages in new NVRAM components are available to perform I/O requests. This is because the NVRAM has not yet accumulated any invalid data in the pages. It follows that I/O requests may be satisfied without first performing garbage collection or any other data management procedures to obtain available memory space. New NVRAM components are thereby able to perform with significant efficiency.

As I/O requests are performed over time, the data in pages of the NVRAM become invalidated. While data is read and written at the page level in NVRAM, it is erased at the block level. Thus, while a number of pages in a block of NVRAM may hold invalid data, individual pages cannot be erased in NVRAM. A significant amount of voltage is needed to erase data, and it is difficult to target that voltage at a more granular level without negatively impacting adjacent cells on the page level. Thus, pages are erased at the block level.

To complicate matters, blocks typically include pages that contain valid data, along with the pages that contain invalid (e.g., stale) data. Thus, to reclaim the pages holding invalid data, valid data is first relocated from pages in the same block. The valid data is relocated to available pages in another block so the original block can be erased. This continual relocating of data results in more program/erase (P/E) cycles being performed than requested by the host system.

SUMMARY

A computer-implemented method, according to one approach, includes: monitoring performance in NVRAM having a plurality of memory blocks. Moreover, a change in the flow rate of I/O requests received at the NVRAM is identified as a result of the monitoring. In response to identifying the change is an increase in the flow rate of received I/O requests, the percentage of invalid pages in a given block of NVRAM that triggers garbage collection to be performed on the given block is increased. However, in response to identifying the change is a decrease in the flow rate of received I/O requests, the percentage of invalid pages in a given block that triggers garbage collection to be performed on the given block is decreased.

A computer program product, according to another approach, includes a computer readable storage medium having program instructions embodied therewith. Moreover, the program instructions are readable by a processor, executable by the processor, or readable and executable by the processor, to cause the processor to: perform the foregoing method.

A system, according to yet another approach, includes: NVRAM having a plurality of blocks and a processor. The system also includes logic that is integrated with the processor, executable by the processor, or integrated with and executable by the processor. Moreover, the logic is configured to: perform the foregoing method.

Other aspects and implementations of the present invention will become apparent from the following detailed description, which, when taken in conjunction with the drawings, illustrate by way of example the principles of the invention.

DETAILED DESCRIPTION

Figure 1:
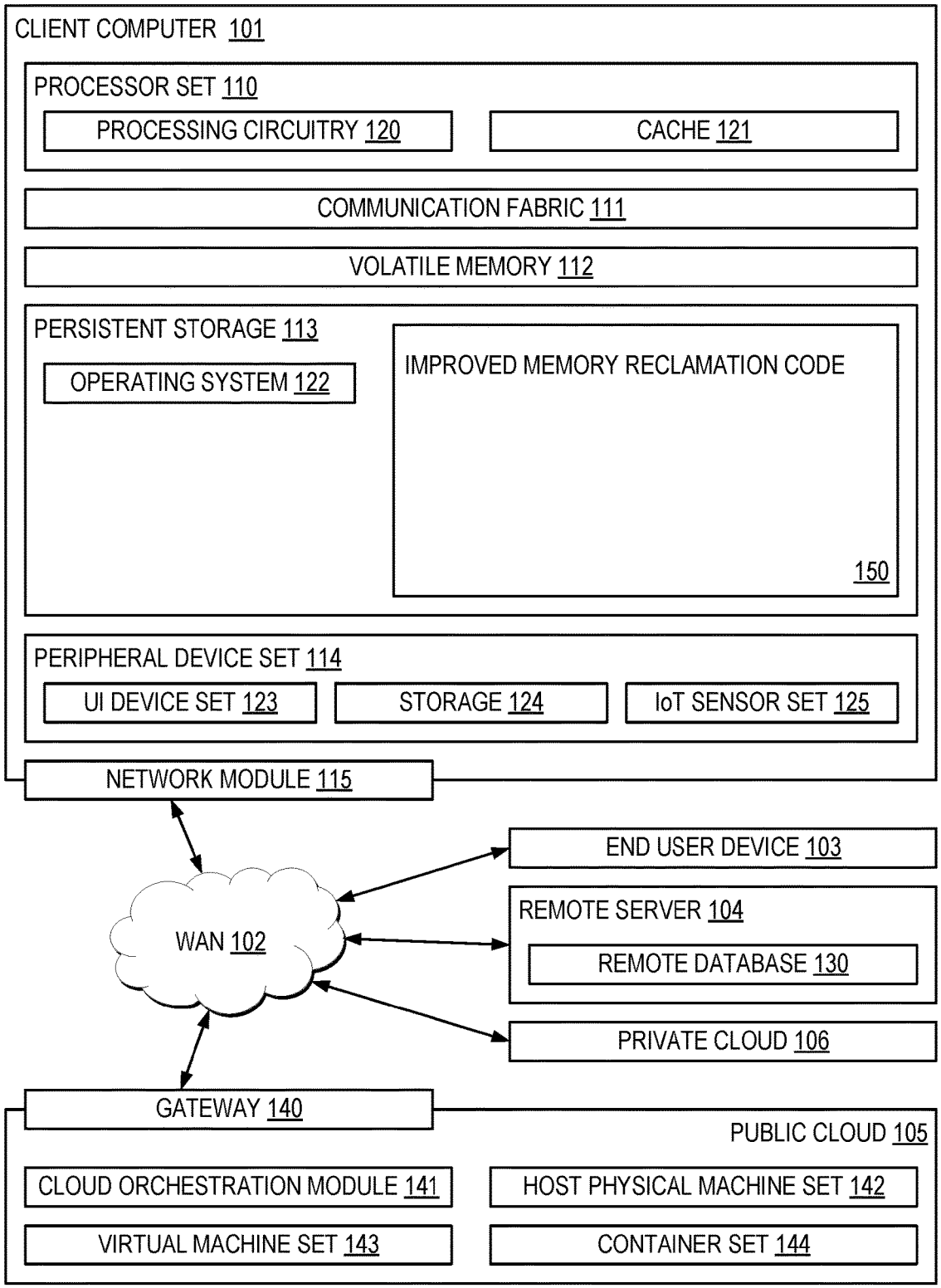
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

Furthermore, this description discloses several preferred approaches of systems, methods and computer program products for dynamically managing garbage collection in NVRAM based on the rate that I/O requests are received. This provides the ability to adjust garbage collection based on the rate at which I/O requests are received. This allows for compute resources to be directed appropriately based on the level of I/O throughput experienced. This allows for memory to perform desirably, even during periods of high throughput, and allows for invalid data to be reclaimed from pages, thereby causing memory to be reconditioned during low throughput periods.

In one general approach, a computer-implemented method includes: monitoring performance in NVRAM having a plurality of memory blocks. Moreover, a change in the flow rate of I/O requests received at the NVRAM is identified as a result of the monitoring. In response to identifying the change is an increase in the flow rate of received I/O requests, the percentage of invalid pages in a given block of NVRAM that triggers garbage collection to be performed on the given block is increased. However, in response to identifying the change is a decrease in the flow rate of received I/O requests, the percentage of invalid pages in a given block that triggers garbage collection to be performed on the given block is decreased.

In another general approach, a computer program product includes a computer readable storage medium having program instructions embodied therewith. Moreover, the program instructions are readable by a processor, executable by the processor, or readable and executable by the processor, to cause the processor to: perform the foregoing method.

In yet another general approach, a system includes: NVRAM having a plurality of blocks and a processor. The system also includes logic that is integrated with the processor, executable by the processor, or integrated with and executable by the processor. Moreover, the logic is configured to: perform the foregoing method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved memory reclamation code at block 150 for dynamically managing garbage collection in NVRAM based on the rate that I/O requests are received. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In approaches herein, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some approaches, a system may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By "integrated with", what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various implementations.

For instance, the computing environment 100 includes memory that is located at a number of data storage locations. For instance, public cloud 105 and/or private cloud 106 may include memory that is configured to store data and provide access to the stored data. Similarly, client computer 101 and/or EUD 103 may include memory, e.g., such as storage 124. The type of storage used to form the memory at each location may vary depending on the implementation. For example, data and other information (e.g., metadata) may be stored in hard disk drives (HDDs), magnetic tape, solid state drives (SSDs), etc. The type of storage components implemented in memory may further impact how the data is written to and/or read from the memory. For instance, while sequential memory (e.g., such as HDDs, magnetic tape, optical media, etc.) stores data in a particular order, random access memory (e.g., such as NAND Flash implemented in SSDs) stores data across the memory without a particular pattern. As alluded to above, storing data at random in this manner allows for random access memory to access data in about the same amount of time irrespective of the physical location the data is stored in the memory. This gives memory like NAND Flash improved data access times compared to sequential memory, e.g., as described in further detail below.

Figure 2:
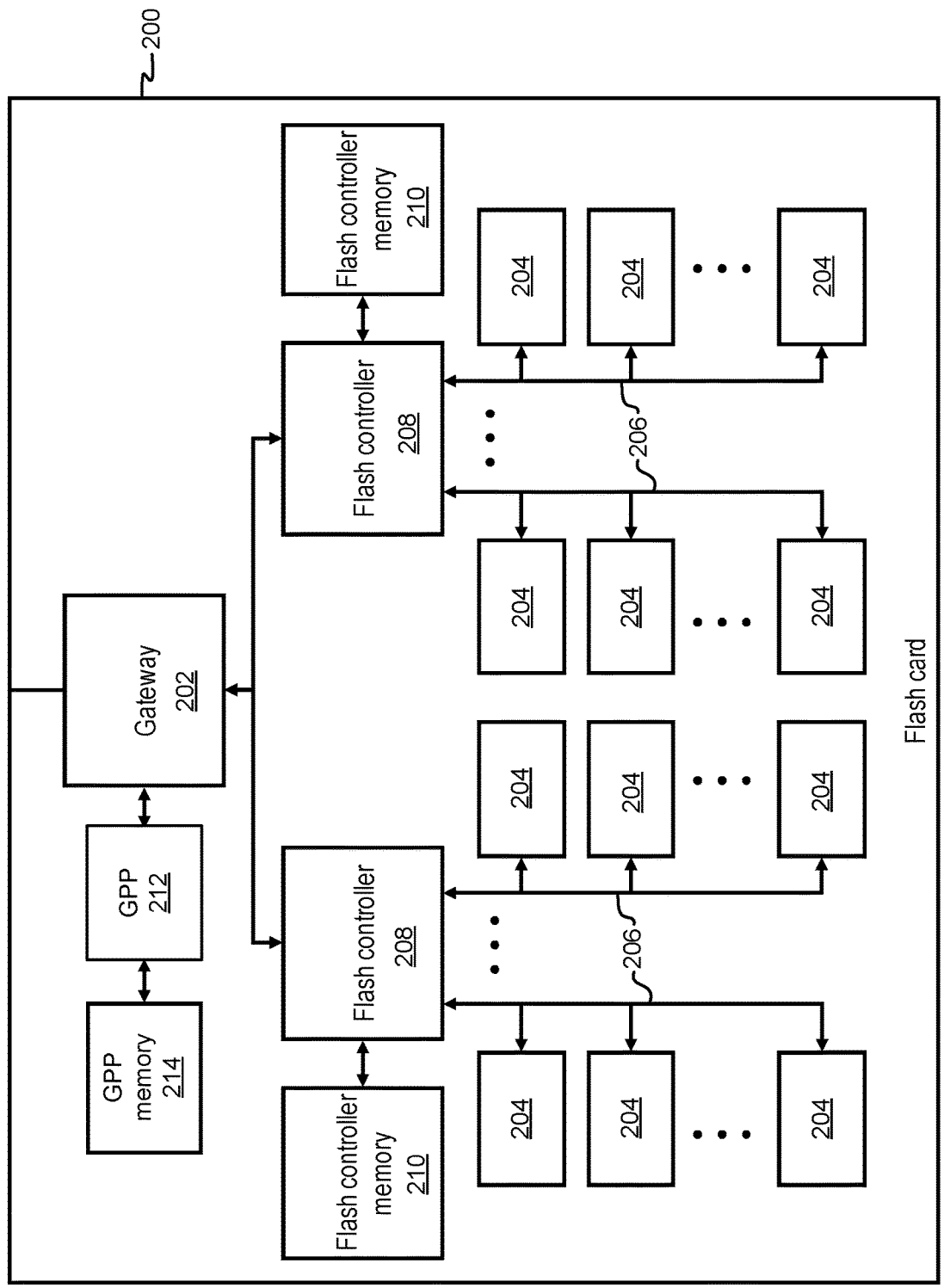
FIG. 2 is a diagram of a data storage system architecture, in accordance with one approach.

FIG. 2 illustrates a memory card 200 having random access memory included therein, in accordance with one approach. It should be noted that although memory card 200 is depicted as an exemplary non-volatile data storage card in the present approach, various other types of non-volatile data storage cards may be used in a data storage system according to alternate approaches. It follows that the architecture and/or components of memory card 200 are in no way intended to limit the invention, but rather have been presented as a non-limiting example.

Moreover, as an option, the present memory card 200 may be implemented in conjunction with features from any other approach listed herein, such as those described with reference to the other FIGS., e.g., such as FIG. 1. However, such memory card 200 and others presented herein may be used in various applications and/or in permutations which may or may not be specifically described in the illustrative approaches listed herein. Further, the memory card 200 presented herein may be used in any desired environment.

With continued reference to FIG. 2, memory card 200 includes a gateway 202, a general purpose processor (GPP) 212 (such as an ASIC, FPGA, CPU, etc.) connected to a GPP memory 214 (which may comprise RAM, ROM, battery-backed DRAM, phase-change memory PC-RAM, MRAM, STT-MRAM, etc., or a combination thereof), and a number of memory controllers 208, which include Flash controllers in the present example. Each memory controller 208 is connected to a plurality of NVRAM modules 204 (which may comprise NAND Flash or other non-volatile memory type(s) such as those listed above) via channels 206.

According to some approaches, one or more of the controllers 208 may be or include one or more processors, and/or any logic for controlling any subsystem of the memory card 200. For example, the controllers 208 typically control the functions of NVRAM memory modules 204 such as, data writing, data recirculation, data reading, etc. The controllers 208 may operate using logic known in the art, as well as any logic disclosed herein, and thus may be considered as a processor for any of the descriptions of non-volatile memory included in approaches herein.

Moreover, the controller 208 may be configured and/or programmable to perform or control some or all of the methodologies presented herein. Thus, the controller 208 may be considered to be configured to perform various operations by way of logic programmed into one or more chips, modules, and/or blocks; software, firmware, and/or other instructions being available to one or more processors; etc., and combinations thereof.

Referring still to FIG. 2, each memory controller 208 is also connected to a controller memory 210 which preferably includes a cache which replicates a non-volatile memory structure according to the approaches described herein. However, depending on the desired approach, the controller memory 210 may be battery-backed DRAM, phase-change memory PC-RAM, MRAM, STT-MRAM, etc., or a combination thereof.

Memory controllers 208, GPP 212, and/or other controllers described herein may be able to perform various functions on stored data, depending on the desired approach. Specifically, memory controllers or GPP 212 may include logic configured to perform any one or more of the following functions, which are in no way intended to be an exclusive list. In other words, depending on the desired approach, logic of a storage system may be configured to perform additional or alternative functions, as would be appreciated by one skilled in the art upon reading the present description.

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, logic erase blocks (LEBs) may be identified for being reclaimed and/or relocated. Typically, one LEB corresponds to one block stripe, but alternative implementations may consider a fixed number of block stripes or a single block building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary approach, which is in no way intended to limit the invention, memory controllers (e.g., see 208 and/or GPP 212 of FIG. 2) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing heat separation.

Moreover, write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired approach, logic of a storage system may be configured to perform additional or alternative functions, as would be appreciated by one skilled in the art upon reading the present description.

Figure 3:
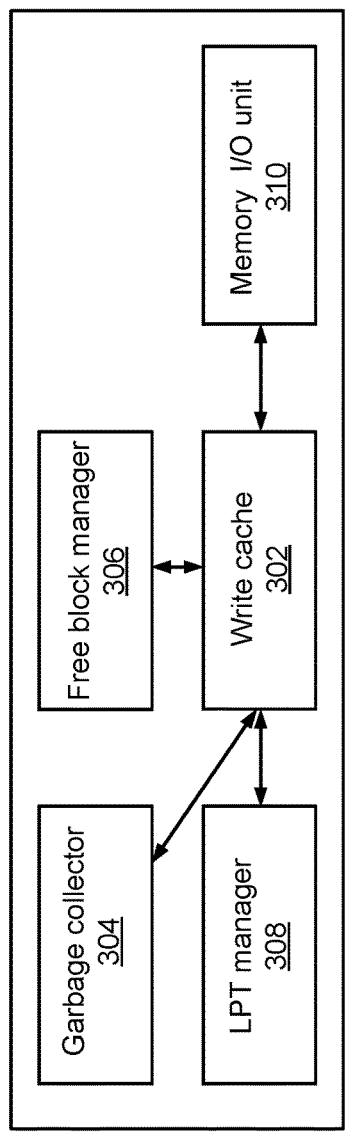
FIG. 3 is a system diagram, in accordance with one approach.

Referring now to FIG. 3, a system 300 is illustrated in accordance with one approach. As an option, the present system 300 may be implemented in conjunction with features from any other approach listed herein, such as those described with reference to the other FIGS. However, such system 300 and others presented herein may be used in various applications and/or in permutations which may or may not be specifically described in the illustrative approaches listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired approach. According to an exemplary approach, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4 KiB or 16 KiB logical addresses. The memory I/O unit 310 communicates with the memory chips in order to perform low level operations, e.g., such as reading one or more non-volatile memory pages, writing a non-volatile memory page, erasing a non-volatile memory block, etc.

Figure 4:
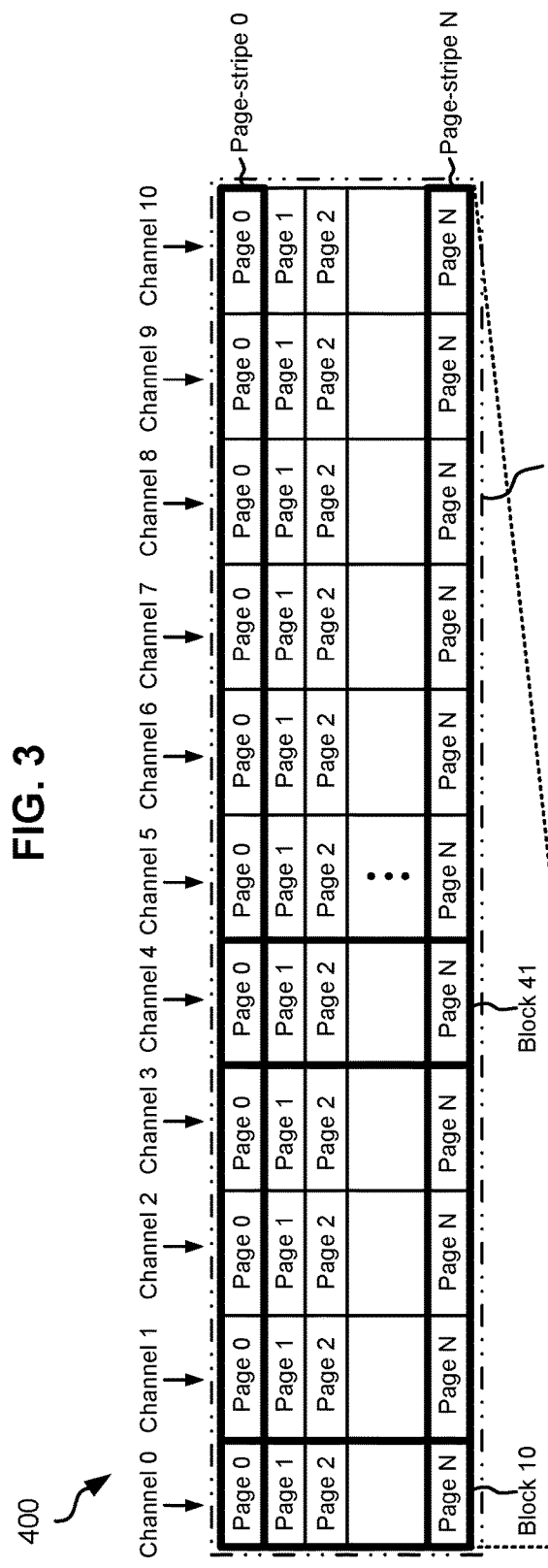
FIG. 4 is a conceptual diagram which includes a block-stripe and page-stripe, in accordance with one approach.
Figure 4:
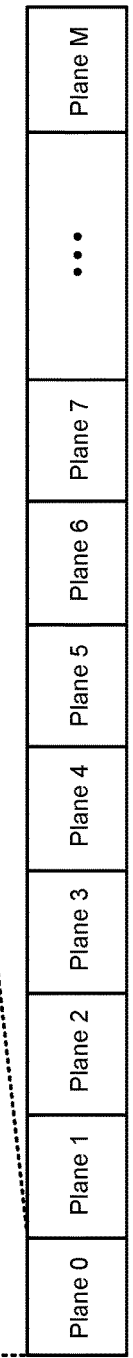

To better understand the distinction between block-stripes and page-stripes as used herein, FIG. 4 is a conceptual diagram 400, in accordance with one approach. LEBs are built from block stripes and typically a single block stripe is used to build a LEB. However, alternative approaches may use multiple block stripes to form an LEB. As an option, the present conceptual diagram 400 may be implemented in conjunction with features from any other approach listed herein, such as those described with reference to the other FIGS. However, such conceptual diagram 400 and others presented herein may be used in various applications and/or in permutations which may or may not be specifically described in the illustrative approaches listed herein. Further, the controller conceptual diagram 400 presented herein may be used in any desired environment. Thus, the exemplary non-volatile memory controller conceptual diagram 400 may be implemented in defining the organization of data stored in non-volatile memory.

Looking to FIG. 4, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given approach of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

It should also be noted that in different implementations, the number of pages in each block and/or the number of channels in each plane may vary. According to an example, which is in no way intended to limit the invention, a block may include 256 pages, but could include more or fewer in different approaches. Similarly, the number of channels per plane and/or the number of planes may vary.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As previously mentioned, the operational efficiency of NVRAM components typically degrades over time. For instance, virtually all pages in new NVRAM components are available to perform I/O requests. This is because the NVRAM has not yet accumulated any invalid data in the pages. It follows that I/O requests may be satisfied without first performing garbage collection or any other data management procedures to obtain available memory space. New NVRAM components are thereby able to perform with significant efficiency.

However, as I/O requests are performed over time, the data in pages of the NVRAM become invalidated. While data is read and written at the page level in NVRAM, it must be erased at the block level. Thus, while a number of pages in a block of NVRAM may hold invalid data, individual pages cannot be erased in NVRAM. A significant amount of voltage is needed to erase data, and it is difficult to target that voltage at a more granular level without negatively impacting adjacent cells on the page level.

Again, the inability to overwrite or erase data at the page level results in data updates and deletions being processed much differently than with memory that stores data linearly (e.g., HDDs). For example, if a user updates a file, the updated file must be written to empty pages rather than the pages that hold the original version of the file. Afterward, the data in the original pages are marked as stale, indicating the data stored therein is no longer valid.

Pages that contain stale data cannot be used until they are erased, and pages can only be erased at the block (e.g., LEB) level. To complicate matters, blocks typically include pages that contain valid data, along with the pages that contain invalid (e.g., stale) data. Thus, to reclaim the pages holding invalid data, valid data is first relocated from pages in the same block. The valid data is relocated to available pages in another block so the original block can be erased. This continual relocating of data results in significantly more P/E cycles being performed than requested by the host system (e.g., write amplification). Increased write amplification can thereby reduce the effective lifespan of NVRAM and have a negative impact on system performance.

Moreover, the size of the LEB directly affects garbage collection induced write amplification. In other words, the larger the LEB, the more likely it becomes that unrelated data becomes stored together in the LEB, and therefore more of the LEB data may have to be relocated upon garbage collection selection. It follows that while NVRAM is able to maintain operation even in the presence of invalid data, performance of memory as a whole is degraded as invalid data accumulates in the pages of conventional products.

In sharp contrast to the conventional shortcomings described above, implementations herein are able to selectively improve performance of memory in-use. Thus, as memory performance decreases with use over time, implementations herein are able to remove the impact that use has on the memory and increase operational efficiency, e.g., as will be described in further detail below.

Figure 5:
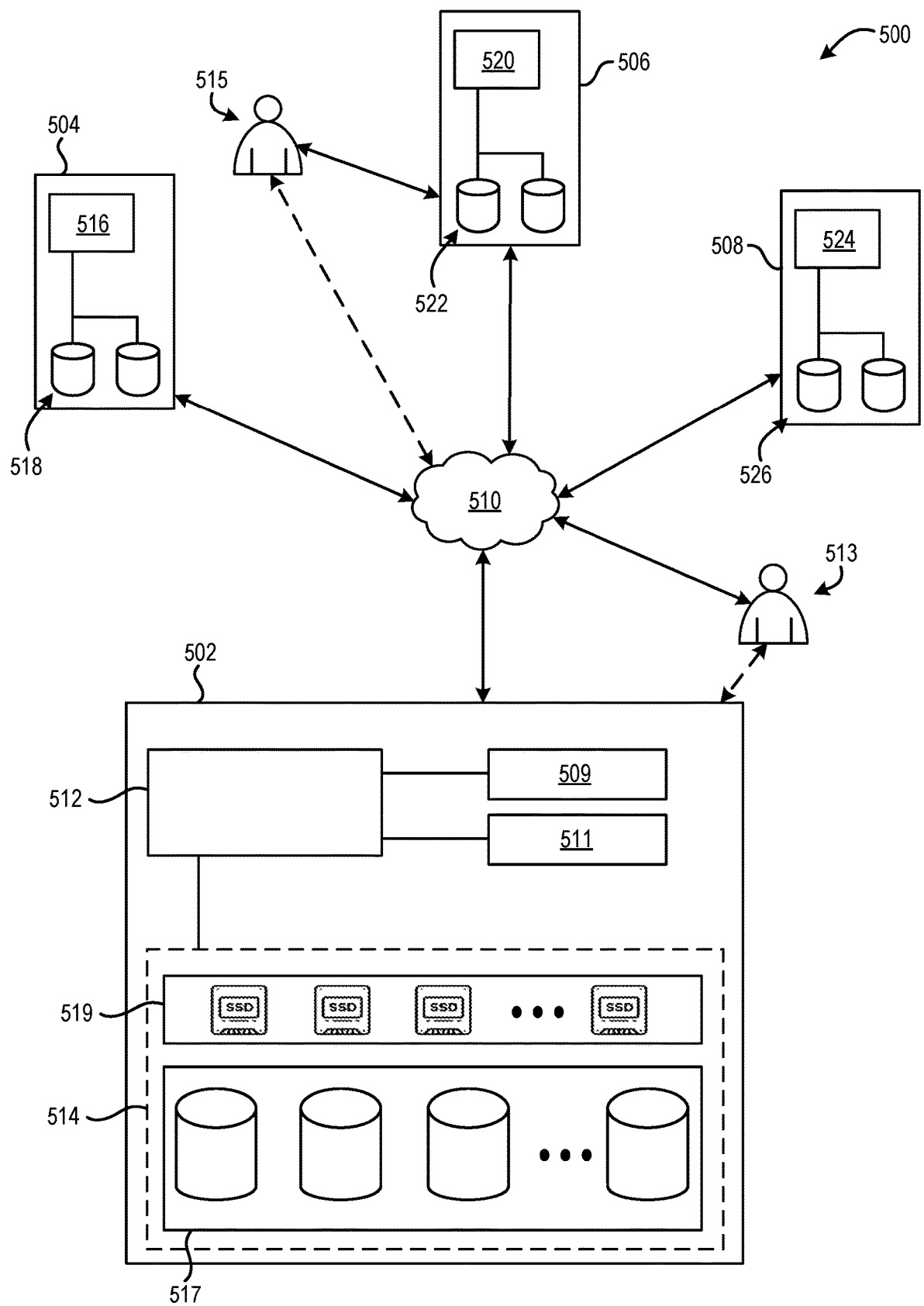
FIG. 5 is a representational view of a storage system, in accordance with one approach.

Looking now to FIG. 5, a data storage system 500 accessible to one or more users is illustrated in accordance with one approach. For instance, the system 500 may include a central data storage location used to store data for a number of distributed host locations. As an option, the present system 500 may be implemented in conjunction with features from any other approach listed herein, such as those described with reference to the other FIGS., such as FIGS. 1-4. However, such system 500 and others presented herein may be used in various applications and/or in permutations which may or may not be specifically described in the illustrative approaches or implementations listed herein. Further, the system 500 presented herein may be used in any desired environment. Thus FIG. 5 (and the other FIGS.) may be deemed to include any possible permutation.

As shown, the system 500 includes a central data storage location 502 that is connected to a first host location 504, a second host location 506, and a third host location 508. Specifically, the central data storage location 502 and host locations 504, 506, 508 are connected to a network 510, and may thereby be positioned in different geographical locations. The network 510 may be of any type, e.g., depending on the desired approach. For instance, in some approaches the network 510 is a WAN, e.g., such as the Internet. However, an illustrative list of other network types which network 510 may implement includes, but is not limited to, a LAN, a PSTN, a SAN, an internal telephone network, etc. As a result, any desired information, data, commands, instructions, responses, requests, etc. may be sent between the host locations 504, 506, 508 and/or central data storage location 502, regardless of the amount of separation which exists therebetween, e.g., despite being positioned at different geographical locations.

However, it should also be noted that two or more of the host locations 504, 506, 508 and/or central data storage location 502 may be connected differently depending on the approach. According to an example, two edge compute nodes may be located relatively close to each other and connected by a wired connection, e.g., a cable, a fiber-optic link, a wire, etc., or any other type of connection which would be apparent to one skilled in the art after reading the present description. It follows that the particular approach illustrated in FIG. 5 is in no way intended to be limiting.

With continued reference to FIG. 5, the host locations 504, 506, 508 may have a different configuration than the central data storage location 502. For example, in some implementations the central data storage location 502 includes a large (e.g., robust) processor 512 coupled to a cache 509 and a tiered data storage module 514 having a relatively high storage capacity. For instance, the module 514 includes a first tier of memory 517 having an array of HDDs included therein, as well as a second tier of memory 519 having one or more SSDs included therein.

The central data storage location 502 is thereby able to process and store a relatively large amount of incoming data. The central data storage location 502 may receive data and/or data operation requests from a number of different locations, e.g., such as each of host locations 504, 506, 508. This allows for different hosts locations (also referred to herein as "hosts") to be connected to, and manage, data stored in memory at the central location. The components included in the central data storage location 502 thereby preferably have a higher storage capacity and throughput than components included in each of the host locations 504, 506, 508 to accommodate the higher flow of data experienced at the central data storage location 502.

It should be noted that with respect to the present description, "data" may include any desired type of information. For instance, in different implementations data can include raw sensor data, metadata, program commands, instructions, etc. It follows that the processor 512 may use the cache 509 and/or tiered data storage module 514 to actually cause one or more data operations to be performed. According to an example, the processor 512 at the central data storage location 502 may be used to perform one or more operations of method 600 of FIG. 6A.

An administrator 513 of the central data storage location 502 and/or processor 512 itself is shown as being connected to network 510 in FIG. 5. In some implementations, the administrator 513 may be directly connected to the central data storage location 502 as represented by the dashed arrowed line. It follows that the administrator 513 may be able to control at least a portion of the central data storage location 502. In some approaches, the administrator 513 may be able to control a clustered filesystem that is accessible from the central data storage location 502 and distributed across host locations 504, 506, 508, e.g., as would be appreciated by one skilled in the art after reading the present description.

A user 515 is also illustrated as being connected to one of the host locations 506. In some approaches, the user 515 connects to the host location 506 through a compute device (e.g., such as the user's personal computer, mobile phone, etc.) such that information can be exchanged therebetween. However, in other approaches the user 515 may be able to access the host location 506 using one or more terminals having a user interface. The user 515 may also be connected to the network 510 in some implementations. Accordingly, the user 515 may access host location 506 and/or other locations in system 500 through the network 510 in such implementations. In still other implementations, the user may be able to access network 510 through a direct connection to the host location 506.

The first host location 504 includes a processor 516 coupled to memory 518. Similarly, host location 506 includes a processor 520 coupled to memory 522, and host location 508 includes a processor 524 coupled to memory 526. The memory implemented at each of the host locations 504, 506, 508 may be used to store data received from one or more sensors (not shown) in communication with the respective host locations, a user 515 in communication with one or more of the host locations, other ones of the host locations, different systems also connected to network 510, etc.

It should also be noted that while the host locations 504, 506, 508 are depicted as including similar components and/or design, each of the host locations 504, 506, 508 may include any desired components which may be implemented in any desired configuration. In some instances, each host location in a system may be configured differently to provide each location with a different functionality. According to an example, which is in no way intended to limit the invention, host location 504 may include a cryptographic module (not shown) that allows the host location 504 to produce encrypted data, while host location 506 includes a data compression module (not shown) that allows the host location 506 to produce compressed data.

As noted above, while FIG. 5 includes three different host locations 504, 506, 508, components in the system 500 may change over time. Additional host locations may be added to the system 500 and/or host locations may be removed from the system 500 depending on the situation. For example, the amount of data processed by a central location may increase significantly over time, impacting the amount of available (e.g., free) space in memory compared to the amount of stale space having invalid data. As the number of pages in memory that contain invalid data increases, the efficiency with which I/O requests are performed decreases. Accordingly, it may be desirable to reduce the amount of invalid data in memory at times to achieve a specific level of performance. In other words, by adjusting how often garbage collection is performed on blocks of memory, operational efficiency of the memory itself may be tailored to accommodate different situations.

According to an example, which is in no way intended to be limiting, an influx of I/O requests may be particularly taxing on memory. In order to counteract this influx of I/O requests and maintain a particular level of performance, garbage collection may be performed more sparingly than during nominal operation. In other words, memory may at least temporarily allow a higher amount of invalid data to exist in pages while processing an influx of I/O requests. This allows for more processing power to be directed towards satisfying the influx of I/O requests, thereby preventing an increase in latency that would otherwise be experienced. However, it should be noted that the amount of available space in memory may override any adjustments made to the amount of invalid data currently permitted in memory. For instance, in situations where storage capacity drops below a predetermined threshold (or equivalently out of a predetermined range), garbage collection may be increased to produce a sufficient amount of available (free) pages to satisfy incoming I/O requests.

According to another example, a drop in I/O requests received at memory may also impact how the memory is managed. During these low I/O request periods, processing overhead is relatively low, thereby allowing for more processing overhead to be directed to removing invalid data from memory. For instance, by removing more invalid data during periods of low throughput than during nominal operation, a greater number of pages are available to satisfy I/O requests. This increased amount of available space may thereby be able to accommodate influxes of I/O requests. In other words, by creating a greater amount of storage capacity during low throughput periods, the memory is able to maintain performance during high throughput periods. This desirably ensures the memory does not experience downtime and/or data loss as I/O requests are received at different flow rates over time. This also improves the efficiency with which the memory is able to operate, e.g., as will be described in further detail below.

The system 500 also preferably includes a machine learning module 511 that is configured to form, train, and apply machine learning models of desired types. The machine learning models are preferably configured to evaluate information associated with incoming I/O requests. For instance, in some approaches the machine learning models may be trained to evaluate the rate that I/O requests are received at memory. In other words, the machine learning models may be able to evaluate incoming I/O requests and develop insight over time.

For instance, the machine learning models may be able to determine an average flow rate of I/O requests received over a period of time, e.g., a 24-hour period. The machine learning models may also be able to determine patterns as a result of evaluating incoming I/O requests. For instance, the machine learning models may be able to identify segments of a period of time that are typically involved with receiving I/O requests at a higher rate than average, as well as segments that are typically involved with receiving I/O requests at a lower rate than average.

According to an example, which is in no way intended to be limiting, machine learning models may be used to evaluate I/O requests received over the span of a 24 hour period (i.e., over the course of a day). The evaluation may reveal that I/O requests are received at a high flow rate from 9:00 am to 5:00 pm, and I/O requests are received at a low flow rate from 5:00 pm to 9:00 am. Garbage collection may thereby be adjusted according to this determination, allowing for a higher percentage of invalid data to remain in memory during the high flow rate from 9:00 am to 5:00 pm, and reclaiming a greater amount of the invalid data during the low flow rate from 5:00 pm to 9:00 am.

Figure 6A:
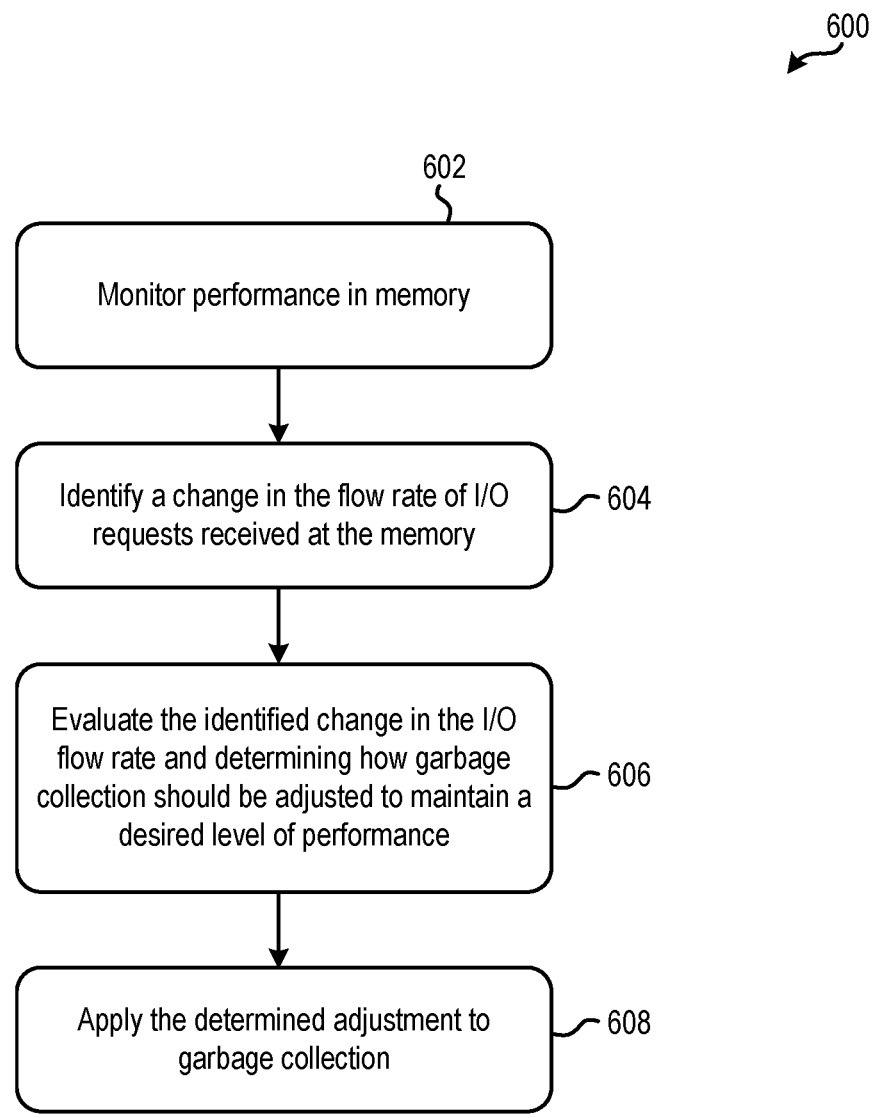
FIG. 6A is a flowchart of a method, in accordance with one approach.

Referring now to FIG. 6A, a computer-implemented method 600 for dynamically managing garbage collection in NVRAM based on the rate that I/O requests are received, is shown according to one embodiment. The method 600 may be performed in accordance with the present invention in any of the environments depicted in FIGS. 1-5, among others, in various embodiments. Of course, more or less operations than those specifically described in FIG. 6A may be included in method 600, as would be understood by one of skill in the art upon reading the present descriptions.

Each of the steps of the method 600 may be performed by any suitable component of the operating environment using known techniques and/or techniques that would become readily apparent to one skilled in the art upon reading the present disclosure. For example, in various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6A, operation 602 of method 600 includes monitoring performance in memory (e.g., NVRAM). Operation 602 preferably includes monitoring the rate that I/O requests are received for memory (also referred to herein as "flow rate" or "I/O flow rate"). By monitoring the flow rate of I/O requests, implementations herein are able to identify "low overhead" state where I/O requests are being received at a slower rate than average, as well as "high overhead" state where I/O requests are received more rapidly than average. As noted above, identifying these low and high overhead states allows for the system to adjust how invalid data is handled in memory. For instance, by reducing garbage collection during high overhead states, a greater percentage of compute power may be directed to processing the influx of I/O requests. Similarly, by increasing garbage collection during low overhead states, unused compute power can be directed to removing a greater amount of invalid data from memory, thereby increasing storage capacity and improving performance of the memory to maintain desirable performance even during future high overhead situations.

Accordingly, operation 604 further includes identifying a change in the flow rate of I/O requests received at the memory (NVRAM). While some changes in I/O flow rate may be identified as a result of monitoring memory performance, additional information may be used to identify the change in flow rates. For instance, a notification (e.g., warning) may actually be received from a user submitting I/O requests, the notification informing memory of an anticipated jump or drop in I/O flow rate. In other approaches, I/O flow rate patterns may be deduced (e.g., using machine learning models) and used to preemptively adjust garbage collection accordingly. In still other approaches, I/O flow rate may be monitored in real-time and garbage collection may be dynamically adjusted to accommodate for the current I/O flow rate.

In response to identifying a change in the I/O flow rate, method 600 advances to operation 606. There, operation 606 includes evaluating the identified change in the I/O flow rate and determining how garbage collection should be adjusted to maintain a desired level of performance. Moreover, operation 608 includes applying the adjustment determined in operation 606. As a result, garbage collection is implemented in a manner that corresponds to memory throughput, thereby improving performance.

Figure 6B:
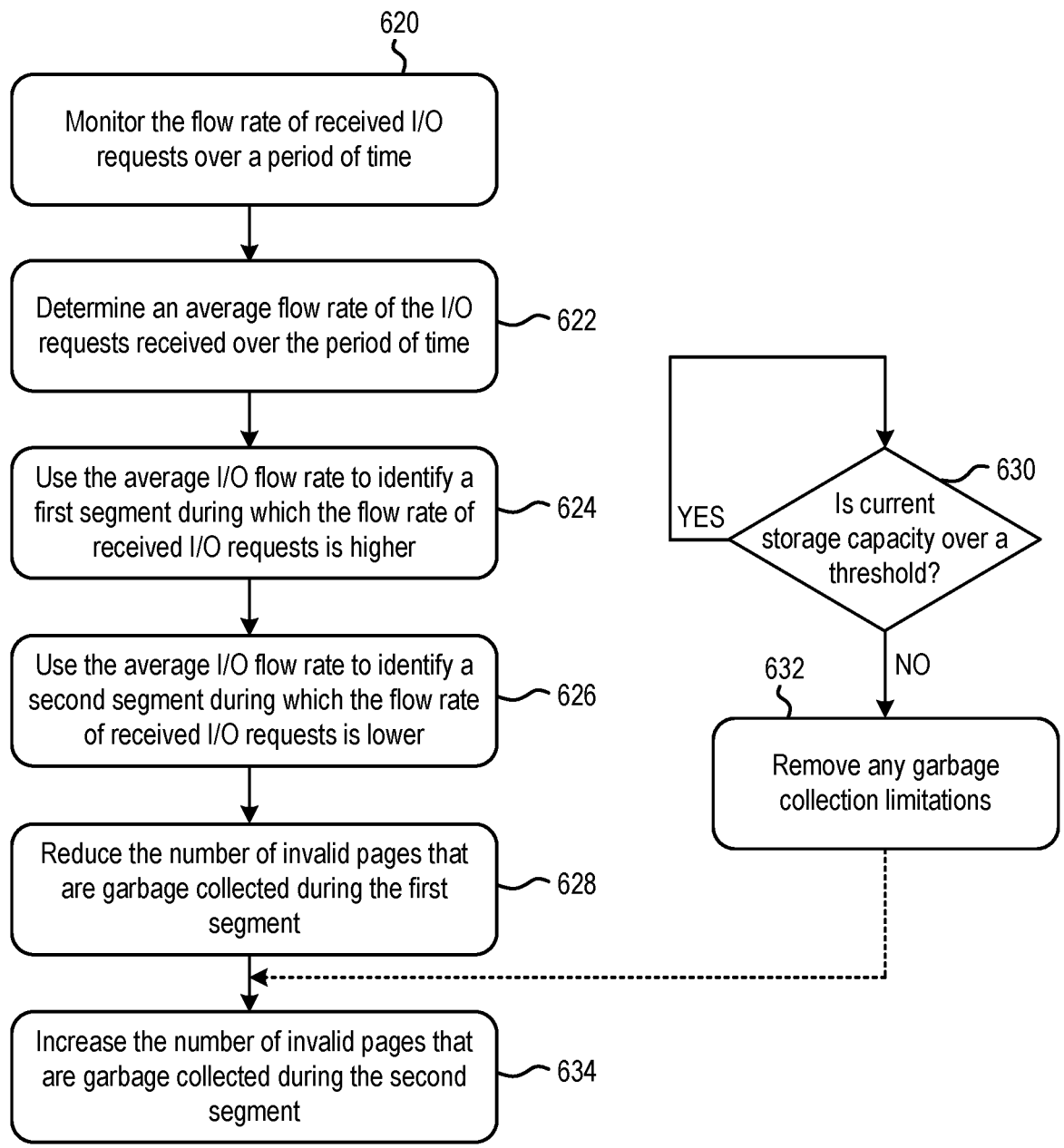
FIG. 6B is a flowchart of sub-operations that may be performed in association with one or more of the operations in the method of FIG. 6A, in accordance with one approach.
Figure 6C:
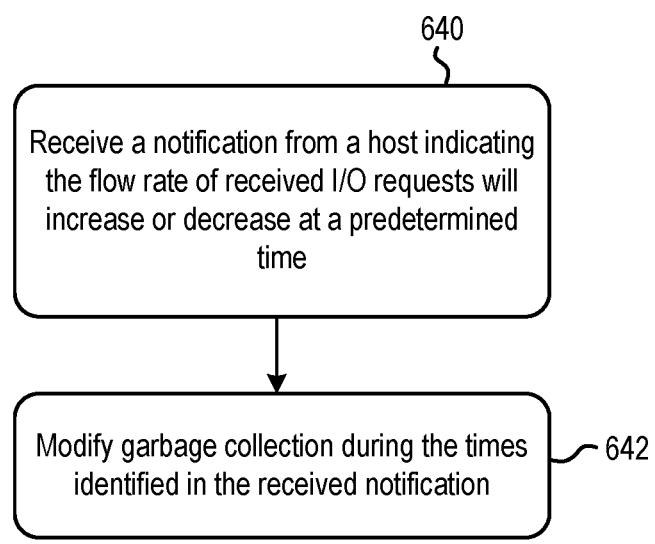
FIG. 6C is a flowchart of sub-operations that may be performed in association with one or more of the operations in the method of FIG. 6A, in accordance with one approach.
Figure 6D:
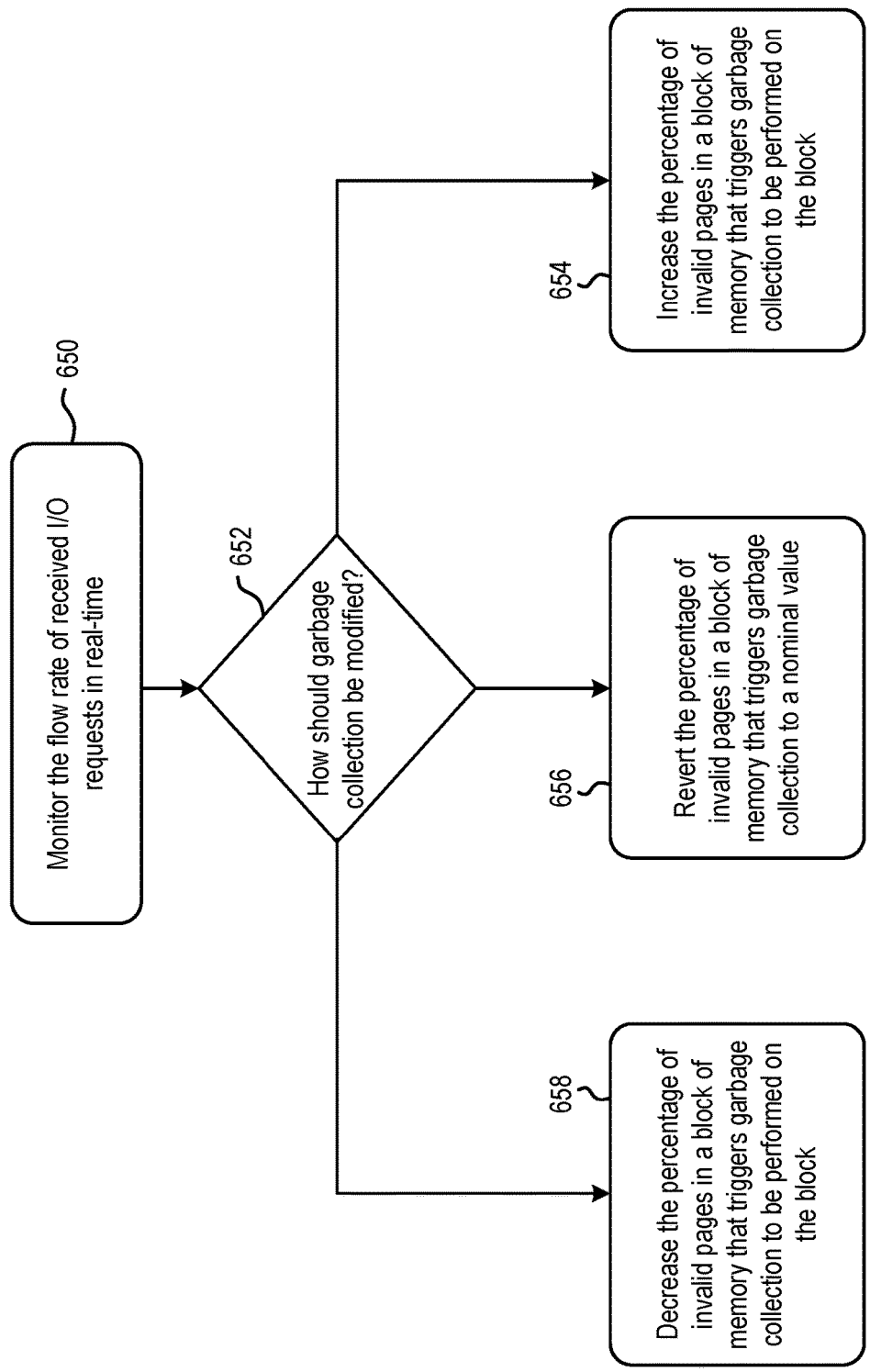
FIG. 6D is a flowchart of sub-operations that may be performed in association with one or more of the operations in the method of FIG. 6A, in accordance with one approach.

Referring momentarily to FIGS. 6B-6D, exemplary sub-operations of identifying a change in the I/O flow rate, determining how garbage collection should be adjusted to maintain a desired level of performance, and actually adjusting garbage collection accordingly, are illustrated in accordance with three different approaches. It follows that any one or more of the sub-operations included in FIGS. 6B-6D may be used to perform operation(s) 604 and/or 606 of FIG. 6A. However, it should be noted that the sub-operations of FIGS. 6B-6D are illustrated in accordance with different approaches which are in no way intended to be limiting.

Looking first to FIG. 6B, sub-operation 620 includes monitoring the flow rate of received I/O requests over a period of time. For example, the I/O flow rate may be monitored over the course of a 24 hour period (i.e., a day). It is also preferred that the I/O flow rate be monitored over multiple periods to develop insight into when and how the I/O requests are received over the period. As noted above, some approaches use machine learning models to evaluate I/O flow rates and identify patterns over the course of the period.

In response to monitoring the I/O flow rate for a sufficient (e.g., desired) amount of time, the flowchart proceeds to sub-operation 622. It should be noted that with respect to the present description, the "sufficient" amount of time may vary depending on a number of factors. For instance, the frequency at which I/O requests are received may impact the length of time the flow rate is monitored before a large enough sample size has been evaluated to make interpretations and determine patterns therein.

There, sub-operation 622 includes determining an average flow rate of the I/O requests received over the period of time. The average flow rate provides a reference point that can be used to quantify the I/O flow rate as it is received in real-time. In some approaches, I/O flow rates that are higher than the determined average may be identified as being a "high" I/O flow rate, while I/O flow rates that are lower than the determined average may be identified as being a "low" I/O flow rate. However, it should be noted that other implementations may use a different value for a reference point used to quantify incoming I/O rates, and therefore use of an average flow rate is in no way intended to be limiting. In other approaches, sub-operation 622 may include determining a weighted average, a median, a mode, etc. I/O flow rate. It follows that information may be gathered while monitoring in sub-operation 620.

Proceeding to sub-operation 624, the average I/O flow rate is used to identify a first segment during which the flow rate of received I/O requests is higher than the average flow rate determined in sub-operation 622. In other words, sub-operation 624 includes comparing the I/O flow rate experienced at various times of the day to the determined average I/O flow rate to identify times of the day that the I/O flow rate rose above the average. In some approaches, a buffer may be applied to the average I/O flow rate such that only flow rates greater than the average I/O flow rate plus some value "X" are actually identified as being "high" I/O flow rates. The value X applied to the average may be a predetermined value, a value which corresponds to the type of I/O requests received, a value based on past performance, a value output by one or more machine learning models trained on information gathered while monitoring the I/O flow rate in sub-operation 620, etc.

Moreover, sub-operation 626 includes using the average I/O flow rate to identify a second segment during which the flow rate of received I/O requests is lower than the average flow rate determined in sub-operation 622. In other words, sub-operation 626 includes comparing the I/O flow rate experienced at various times of the day to the determined average I/O flow rate to identify times of the day that the I/O flow rate dropped below the average. As noted above, a buffer may be applied to the average value in some approaches.

In some approaches, the first and second segments are compared to each other. For instance, the first and second segments may be compared to determine whether the segments are about the same length of time. Moreover, in some instances the first and/or second segments may be lengthened or shortened, e.g., to make the segments about the same length of time, a length that is consistent with a predetermined template length, a length based on the current I/O flow rate, etc.

Proceeding to sub-operation 628, garbage collection is modified such that fewer invalid pages of memory are garbage collected during the first segment than during nominal performance. Specifically, the percentage of invalid pages in a given block of memory that triggers garbage collection is increased during the first segment of each subsequent day (period of time). As a result, blocks of memory will include more invalid pages before being garbage collected during times identified as likely having high I/O flow rates (e.g., based on identified patterns). With respect to the present description, "more" invalid pages is at least a greater number of invalid pages than involved with triggering garbage collection during nominal performance while the I/O flow rate is about equal to the average I/O flow rate. Reducing the number of memory blocks that are garbage collected while I/O flow rate is high desirably allows for compute resources to be directed to satisfying the incoming I/O requests. This allows for memory to operate efficiently during high throughput periods.

While it is desirable for garbage collection to be reduced during these high I/O flow rate situations, it should be noted that storage capacity may override any such compute throttling. Thus, in situations where storage capacity drops below a predetermined threshold, garbage collection may automatically be increased. Accordingly, sub-operation 630 includes monitoring the number of available pages in memory and determining whether the current amount has fallen below a threshold. The threshold may be predetermined by a user, be preset based on designed storage capacity of the memory, based on current I/O flow rate, etc.

In response to determining the number of available pages in memory remains above the threshold, sub-operation 630 is repeated. However, in response to determining the number of available pages in memory has fallen below the threshold, sub-operation 632 is performed. There, sub-operation 632 includes removing any limitations placed on garbage collection (e.g., see sub-operation 628). In other words, the number of invalid pages in a block of memory which triggers garbage collection is decreased, thereby causing more garbage collection to occur, and more available pages created. This allows the number of available pages in memory to rise above the threshold again, returning memory to a balanced state. While sub-operation 632 is shown as entering a remainder of the flowchart between sub-operations 628 and 634, the storage capacity may fall below the threshold at any point, thereby causing garbage collection to be adjusted accordingly. It follows that sub-operation 632 may enter the remainder of the flowchart at any point.

Proceeding now to sub-operation 634, garbage collection is modified such that more invalid pages of memory are garbage collected during the second segment than during nominal performance. Specifically, the percentage of invalid pages in a given block of memory that triggers garbage collection is decreased during the second segment of each subsequent day (period of time). As a result, blocks of memory will include fewer invalid pages before being garbage collected, at least in comparison to during nominal performance when the I/O flow rate is about equal to the average I/O flow rate. Increasing the number of memory blocks that are garbage collected while I/O flow rate is low takes advantage of the available compute throughput to reduce, and in some instances even remove, invalid pages in memory. This desirably allows for compute resources to be directed to return memory to an improved state, allowing for high efficiency during subsequent periods of high I/O flow rates.

It follows that the flowchart of FIG. 6B implements reduced garbage collection during periods that have been identified as consistently receiving high I/O flow rates. Again, this allows for compute resources to be directed to satisfying the I/O requests. Additionally, garbage collection is increased during periods that have been identified as consistently receiving low I/O flow rates. This allows for the invalid pages to be reclaimed, thereby reconditioning the memory to perform more efficiently.

Looking now to FIG. 6C, sub-operation 640 includes receiving a notification from a host, the notification indicating the flow rate of received I/O requests will increase or decrease at a predetermined time. In other words, sub-operation 640 includes receiving an indication that the I/O flow rate will be higher or lower than average at a specific time. In some instances, the notification received from the host may identify different time ranges during which the I/O flow rate is higher or lower than average.

Accordingly, sub-operation 642 includes modifying garbage collection during the times identified in the notification received in sub-operation 640. For instance, memory may be programmed to automatically increase garbage collection during times that the notification identifies as corresponding to low I/O flow rates, and automatically decrease garbage collection during times that the notification identifies as corresponding to high I/O flow rates. It follows that input received from hosts (e.g., a user planning to upload a batch of files to a central storage location at a specific time) may impact how garbage collection is performed.

Looking now to FIG. 6D, sub-operation 650 includes monitoring the flow rate of received I/O requests in real-time. In other words, sub-operation 650 includes evaluating the current I/O flow rate as the I/O requests are received. It follows that sub-operation 650 may involve dynamically identifying changes in I/O flow rates, e.g., such that the appropriate action may be taken.

Accordingly, sub-operation 652 further includes using the current rate at which I/O requests are being received to determine if and/or how garbage collection should be adjusted. Thus, the current I/O flow rate is used to determine how invalid pages in memory should be reclaimed. In response to determining that the current I/O flow rate is in a first "high" predetermined range, the flowchart advances from sub-operation 652 to sub-operation 654. In other words, the flowchart advances to sub-operation 654 in response to determining that the current I/O flow rate is higher than a predetermined value. There, sub-operation 654 includes increasing the percentage of invalid pages in a block of memory that triggers garbage collection to be performed on the block. As noted above, this effectively reduces the number of blocks that qualify for garbage collection, reducing the amount of compute resources that are directed to reclaiming invalid pages.

Returning to sub-operation 652, the flowchart advances to sub-operation 656 in response to determining that the current I/O flow rate is in a second "average" predetermined range. In other words, the flowchart advances to sub-operation 656 in response to determining that the current I/O flow rate is about equal to a predetermined value. There, sub-operation 656 includes reverting the percentage of invalid pages in a block of memory that triggers garbage collection to a nominal value (e.g., nominal percentage). Depending on the approach, the nominal value may be predetermined by a user, based on past I/O flow rates, based on a current storage capacity of memory, etc.

Returning again to sub-operation 652, the flowchart advances to sub-operation 658 in response to determining that the current I/O flow rate is in a third "low" predetermined range. In other words, the flowchart advances to sub-operation 658 in response to determining that the current I/O flow rate is lower than a predetermined value. There, sub-operation 658 includes lowering the percentage of invalid pages in a block of memory that triggers garbage collection to a nominal value. As noted above, this effectively increases the number of blocks that qualify for garbage collection, increasing the amount of compute resources that are directed to reclaiming invalid pages such that performance is improved while compute overhead is low.

It follows that the flowchart of FIG. 6D is able to dynamically adjust garbage collection based on the rate at which I/O requests are received in real-time. Again, this allows for compute resources to be directed to satisfying the I/O requests during periods of high throughput, and for the invalid pages to be reclaimed from memory, thereby causing the memory to be reconditioned during the low throughput periods.

According to other approaches, certain events associated with high I/O flow rates may be identified before they occur. In preparation for these high throughput periods, garbage collection may be further increased such that a substantial percentage of the invalid pages in memory are reclaimed. For example, in preparation for a high throughput period, garbage collection may be modified such that the maximum percentage of invalid pages in memory is 25%, 20%, 18%, 15%, 14%, 13%, 12%, 9%, 8%, 7%, 6%, 5%, 4%, 3%, 2%, 1%, but could be higher or lower depending on the desired approach. In some approaches, all invalid pages may be reclaimed from memory in preparation for the high I/O flow rates. With respect to the present description, "all" invalid pages being reclaimed from memory may correspond to 0% of the pages in memory containing invalid data after reclamation, in some approaches. However, in other approaches some invalid data may be in a protected portion of memory, may be trapped in one or more pages that have failed (e.g., are inoperable), may be stored in pages that have been designated as not participating in garbage collection, etc. Thus, "all" invalid pages being reclaimed from memory may correspond to greater than 0% of the pages in memory containing invalid data in other approaches.

Removing (e.g., reclaiming) all invalid pages, or a desired percentage of invalid pages, from memory (e.g., "reconditioning" the memory) achieves a desired level of memory performance. As noted above, memory efficiency improves as the number of invalid pages decreases. Thus, by modifying garbage collection such that the number of invalid pages in memory is limited to a desired percentage, a desired level of performance may be achieved, e.g., in preparation for a high I/O flow rate. It follows that invalid pages may be reclaimed such that the memory is reconditioned in response to a predetermined condition being met, the predetermined condition indicating that the number of I/O requests received will increase. It follows that depending on the approach, the predetermined condition may be met in response to identifying an increased I/O flow rate in real-time, receiving a notification from a host that indicates a high I/O flow rate will be experienced at a particular time, identifying a portion of the day that is consistently correlated with high I/O flow rates (e.g., during business hours), etc. The "predetermined condition" that indicates a high I/O flow rate may thereby include any of the determinations implemented in FIGS. 6B-6C above.

It should be noted that with respect to the terms used herein, use of terms like "below a threshold," "above a threshold," "inside a range," "outside a range," etc., are in no way intended to be limiting. Rather, equivalent determinations may be made, e.g., as to whether a value is within a predetermined range, whether a value is outside a predetermined range, whether an absolute value is above a threshold, whether a value is below a threshold, etc., depending on the desired approach. Additionally, while various approaches herein have been described in the context of NAND Flash, this is in no way intended to be limiting. Rather, one or more of the approaches herein may be applied to any desired type of NVRAM, e.g., as would be appreciated by one skilled in the art after reading the present description.

It should also be noted that software for performing the methodology of FIGS. 6A-6D may be deployed to a computer that is used to perform the various operations of the method via any known technique(s). An exemplary process for such deployment is presented immediately below with respect to FIG. 7.

Figure 7:
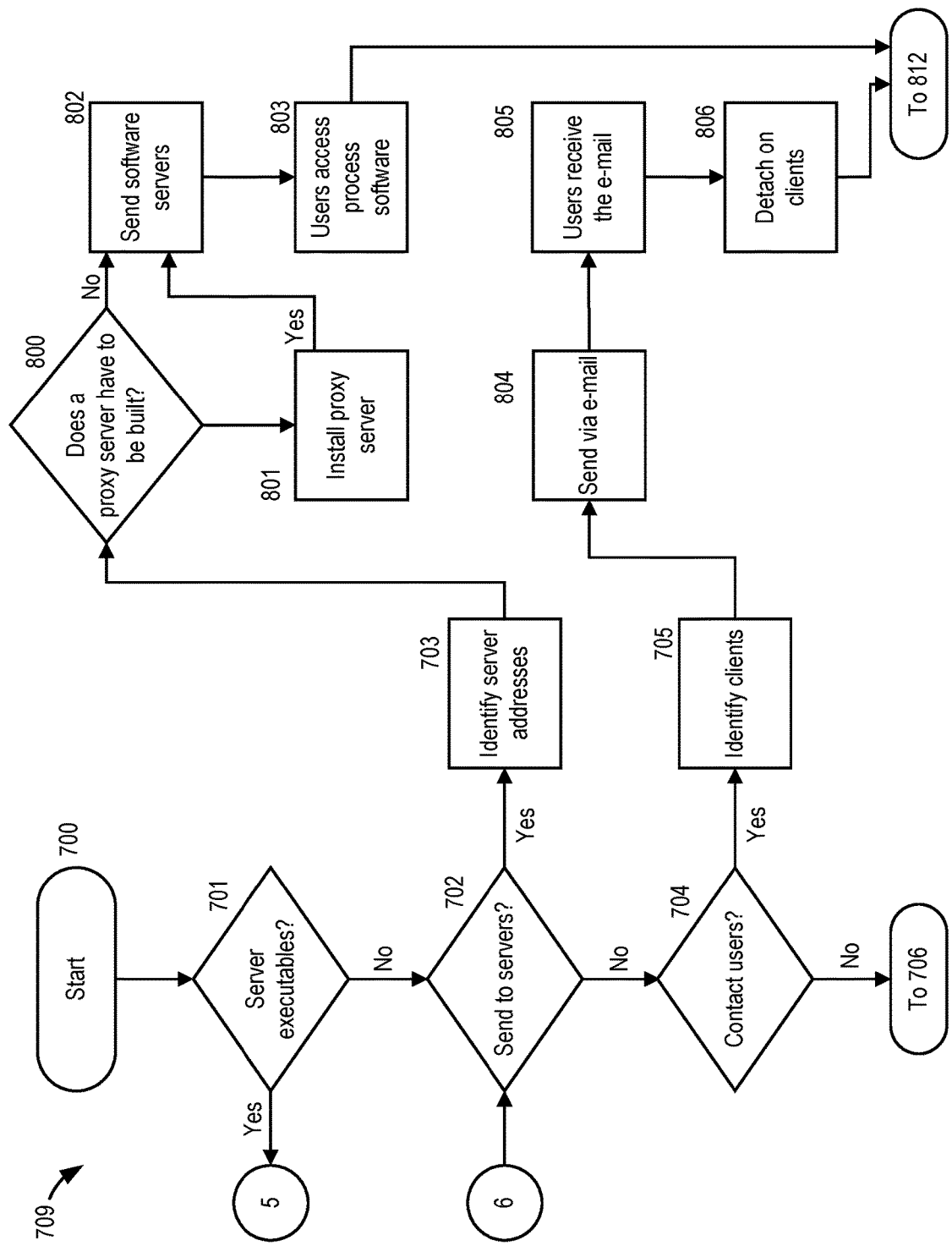
FIG. 7 is a flowchart of a method, in accordance with one approach.
Figure 7:
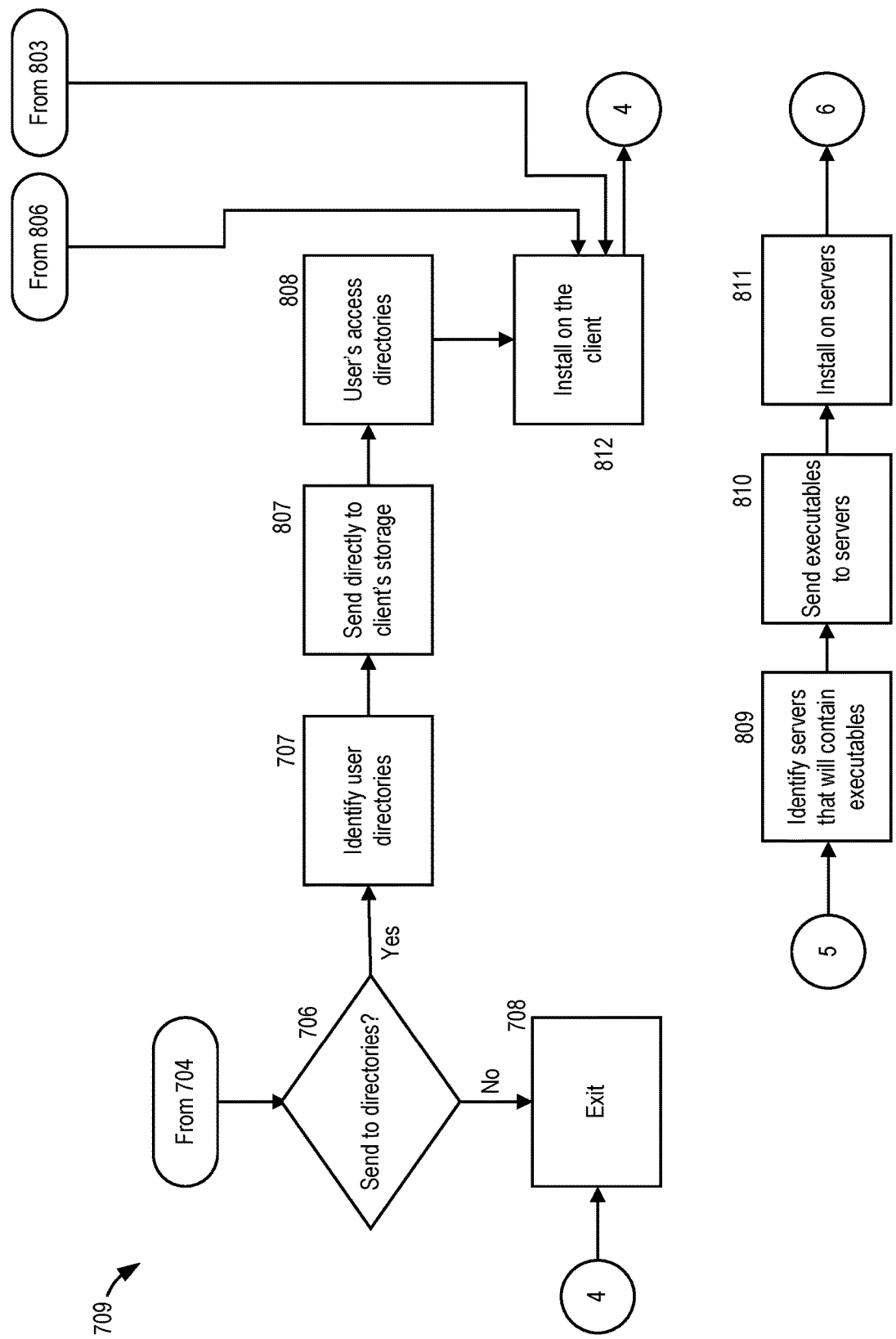

Now referring to FIG. 7, a flowchart of a method 709 is shown according to one approach. The method 709 may be performed in accordance with the present invention in any of the environments depicted in FIGS. 1-6C, among others, in various approaches. Of course, more or fewer operations than those specifically described in FIG. 7 may be included in method 709, as would be understood by one of skill in the art upon reading the present descriptions.

Each of the steps of the method 709 may be performed by any suitable component of the operating environment. For example, in some approaches, the method 709 may be partially or entirely performed by a processing circuit, e.g., such as an IaC access manager, or some other device having one or more processors therein. The processor, e.g., processing circuit(s), chip(s), and/or module(s) implemented in hardware and/or software, and preferably having at least one hardware component, may be utilized in any device to perform one or more steps of the method 709. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software associated with for dynamically managing garbage collection in NVRAM based on the rate that I/O requests are received, may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

With continued reference to method 709, step 700 begins the deployment of the process software. An initial step is to determine if there are any programs that will reside on a server or servers when the process software is executed (701). If this is the case, then the servers that will contain the executables are identified (809). The process software for the server or servers is transferred directly to the servers' storage via FTP or some other protocol or by copying through the use of a shared file system (810). The process software is then installed on the servers (811).

Next, a determination is made on whether the process software is to be deployed by having users access the process software on a server or servers (702). If the users are to access the process software on servers, then the server addresses that will store the process software are identified (703).

A determination is made if a proxy server is to be built (800) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (801). The process software is sent to the (one or more) servers either via a protocol such as FTP, or it is copied directly from the source files to the server files via file sharing (802). Another approach involves sending a transaction to the (one or more) servers that contained the process software, and have the server process the transaction and then receive and copy the process software to the server's file system. Once the process software is stored at the servers, the users, via their client computers, then access the process software on the servers and copy to their client computers file systems (803). Another approach is to have the servers automatically copy the process software to each client and then run the installation program for the process software at each client computer. The user executes the program that installs the process software on the client computer (812) and then exits the process (708).

In step 704 a determination is made whether the process software is to be deployed by sending the process software to users via e-mail. The set of users where the process software will be deployed are identified together with the addresses of the user client computers (705). The process software is sent via e-mail (804) to each of the users' client computers. The users then receive the e-mail (805) and then detach the process software from the e-mail to a directory on their client computers (806). The user executes the program that installs the process software on the client computer (812) and then exits the process (708).

Lastly, a determination is made on whether the process software will be sent directly to user directories on their client computers (706). If so, the user directories are identified (707). The process software is transferred directly to the user's client computer directory (807). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (808). The user executes the program that installs the process software on the client computer (812) and then exits the process (708).

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method, comprising:
    monitoring performance in non-volatile random access memory (NVRAM), the NVRAM having a plurality of memory blocks;
    identifying a change in a flow rate of input/output (I/O) requests received at the NVRAM;
    in response to identifying an increase in the flow rate of received I/O requests, increasing a percentage of invalid pages in a given block of NVRAM that triggers garbage collection to be performed on the given block; and
    in response to identifying a decrease in the flow rate of received I/O requests, decreasing the percentage of invalid pages in a given block that triggers garbage collection to be performed on the given block,
    wherein identifying a change in the flow rate of received I/O requests includes:
        receiving a notification from a host, the notification indicating the flow rate of received I/O requests will increase or decrease at a predetermined time, wherein the percentage of invalid pages in a given block that triggers garbage collection to be performed on the given block is adjusted at the predetermined time according to the indicated flow rate,
        in response to determining that the flow rate of received I/O requests falls into a first predetermined range, increasing the percentage of invalid pages in a given block of NVRAM that triggers garbage collection to be performed on the given block, and
        in response to determining that the flow rate of received I/O requests falls into a second predetermined range, resetting the percentage of invalid pages in a given block of NVRAM that triggers garbage collection to be performed on the given block to a nominal percentage.

2. The computer-implemented method of claim 1,
    wherein identifying a change in the flow rate of received I/O requests includes:
    monitoring the flow rate of received I/O requests over a period of time;
    determining an average flow rate of I/O requests received over the period of time;

identifying a first segment of the period of time during which the flow rate of received I/O requests is higher than the average flow rate; and identifying a second segment of the period of time during which the flow rate of received I/O requests is lower than the average flow rate.

3. The computer-implemented method of claim 2, comprising:

increasing the percentage of invalid pages in a given block of NVRAM that triggers garbage collection during the first segment; and decreasing the percentage of invalid pages in a given block of NVRAM that triggers garbage collection during the second segment.

4. The computer-implemented method of claim 1, wherein identifying a change in the flow rate of received I/O requests includes:

monitoring the flow rate of received I/O requests in real-time; and in response to determining that the flow rate of received I/O requests falls into a third predetermined range, decreasing the percentage of invalid pages in a given block of NVRAM that triggers garbage collection to be performed on the given block.

5. The computer-implemented method of claim 4, wherein the first predetermined range includes flow rates that are slower than the second predetermined range, wherein the second predetermined range includes flow rates that are slower than the third predetermined range.

6. The computer-implemented method of claim 1, wherein the NVRAM is NAND Flash.

7. The computer-implemented method of claim 1, comprising:

in response to determining the NVRAM has an amount of useable storage capacity below a predetermined threshold, denying an increase to the percentage of invalid pages in a given block of NVRAM that triggers garbage collection.

8. The computer-implemented method of claim 7, comprising:

in response to determining that the NVRAM has an amount of useable storage capacity below the predetermined threshold, decreasing the percentage of invalid pages in a given block of NVRAM that triggers garbage collection to be performed on the given block past a nominal value.

9. The computer-implemented method of claim 1, comprising:

in response to a predetermined condition being met, causing all invalid pages in the NVRAM to be reclaimed.

10. The computer-implemented method of claim 1, comprising:

in response to determining that the flow rate of received I/O requests falls into a first predetermined range, determining whether an amount of useable storage capacity in the NVRAM is below a predetermined threshold;

in response to determining the amount of useable storage capacity in the NVRAM is below the predetermined threshold, denying any changes to the percentage of invalid pages in a given block of NVRAM that triggers garbage collection to be performed on the given block; and in response to determining the amount of useable storage capacity in the NVRAM is not below the predetermined threshold, increasing the percentage of invalid pages in a given block of NVRAM that triggers garbage collection to be performed on the given block.

11. A computer program product, comprising a computer readable storage medium having program instructions embodied therewith, the program instructions readable by a processor, executable by the processor, or readable and executable by the processor, to cause the processor to:

monitor performance in non-volatile random access memory (NVRAM), the NVRAM having a plurality of memory blocks;

identify a change in a flow rate of input/output (I/O) requests received at the NVRAM;

in response to identifying an increase in the flow rate of received I/O requests, increase a percentage of invalid pages in a given block of NVRAM that triggers garbage collection to be performed on the given block; and in response to identifying a decrease in the flow rate of received I/O requests, decrease the percentage of invalid pages in a given block that triggers garbage collection to be performed on the given block wherein increasing the percentage of invalid pages in a given block of NVRAM that triggers garbage collection is denied in response to the NVRAM having an amount of useable storage capacity below a predetermined threshold, wherein identifying a change in the flow rate of received I/O requests includes:

in response to determining that the flow rate of received I/O requests falls into a first predetermined range, increasing the percentage of invalid pages in a given block of NVRAM that triggers garbage collection to be performed on the given block, and in response to determining that the flow rate of received I/O requests falls into a second predetermined range, resetting the percentage of invalid pages in a given block of NVRAM that triggers garbage collection to be performed on the given block to a nominal percentage.

12. The computer program product of claim 11, wherein identifying a change in the flow rate of received I/O requests includes:

monitoring the flow rate of received I/O requests over a period of time;

determining an average flow rate of I/O requests received over the period of time;

identifying a first segment of the period of time during which the flow rate of received I/O requests is higher than the average flow rate; and identifying a second segment of the period of time during which the flow rate of received I/O requests is lower than the average flow rate.

13. The computer program product of claim 12, wherein the program instructions are readable and/or executable by the processor to cause the processor to:

increase the percentage of invalid pages in a given block of NVRAM that triggers garbage collection during the first segment; and decrease the percentage of invalid pages in a given block of NVRAM that triggers garbage collection during the second segment.

14. The computer program product of claim 11, wherein identifying a change in the flow rate of received I/O requests includes:

receiving a notification from a host, the notification indicating the flow rate of received I/O requests will increase or decrease at a predetermined time, wherein the percentage of invalid pages in a given block that triggers garbage collection to be performed on the given block is adjusted at the predetermined time according to the indicated flow rate.

15. The computer program product of claim 11, wherein identifying a change in the flow rate of received I/O requests includes:
monitoring the flow rate of received I/O requests in real-time; and
in response to determining that the flow rate of received I/O requests falls into a third predetermined range, decreasing the percentage of invalid pages in a given block of NVRAM that triggers garbage collection to be performed on the given block.

16. The computer program product of claim 15, wherein the first predetermined range includes flow rates that are slower than the second predetermined range, wherein the second predetermined range includes flow rates that are slower than the third predetermined range.

17. The computer program product of claim 11, wherein the program instructions are readable and/or executable by the processor to cause the processor to:
in response to a predetermined condition being met, cause all invalid pages in the NVRAM to be reclaimed.

18. A system, comprising:
non-volatile random access memory (NVRAM) having a plurality of blocks;
a processor; and
logic integrated with the processor, executable by the processor, or integrated with and executable by the processor, the logic being configured to:
monitor performance in non-volatile random access memory (NVRAM), the NVRAM having a plurality of memory blocks;
identify a change in a flow rate of input/output (I/O) requests received at the NVRAM;
in response to identifying an increase in the flow rate of received I/O requests, increase a percentage of invalid pages in a given block of NVRAM that triggers garbage collection to be performed on the given block, wherein increasing the percentage of invalid pages in a given block of NVRAM that triggers garbage collection is denied in response to the NVRAM having an amount of useable storage capacity below a predetermined threshold;
in response to identifying a decrease in the flow rate of received I/O requests, decrease the percentage of invalid pages in a given block that triggers garbage collection to be performed on the given block; and
in response to predicting a time during which the flow rate of received I/O requests will be high, cause all invalid pages in the NVRAM to be reclaimed,
wherein identifying a change in the flow rate of received I/O requests includes:
identifying a first segment of the period of time during which the flow rate of received I/O requests is higher than the average flow rate,
increase the percentage of invalid pages in a given block of NVRAM that triggers garbage collection during the first segment,
identifying a second segment of the period of time during which the flow rate of received I/O requests is lower than the average flow rate, and
decrease the percentage of invalid pages in a given block of NVRAM that triggers garbage collection during the second segment.

19. The system of claim 18, wherein identifying a change in the flow rate of received I/O requests includes:
monitoring the flow rate of received I/O requests over a period of time; and
determining the average flow rate of I/O requests received over the period of time.

20. The system of claim 18, wherein identifying a change in the flow rate of received I/O requests includes:
monitoring the flow rate of received I/O requests in real-time;
in response to determining that the flow rate of received I/O requests falls into a first predetermined range, increasing the percentage of invalid pages in a given block of NVRAM that triggers garbage collection to be performed on the given block;
in response to determining that the flow rate of received I/O requests falls into a second predetermined range, resetting the percentage of invalid pages in a given block of NVRAM that triggers garbage collection to be performed on the given block to a nominal percentage; and
in response to determining that the flow rate of received I/O requests falls into a third predetermined range, decreasing the percentage of invalid pages in a given block of NVRAM that triggers garbage collection to be performed on the given block.

* * * * *